July 7, 1925.
M. D. BOARDMAN
INDICATOR
Filed Oct. 12, 1923
1,545,391
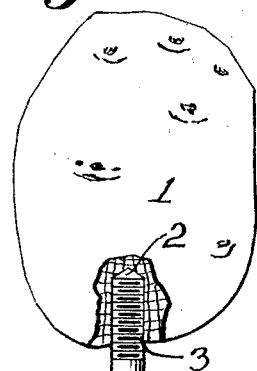
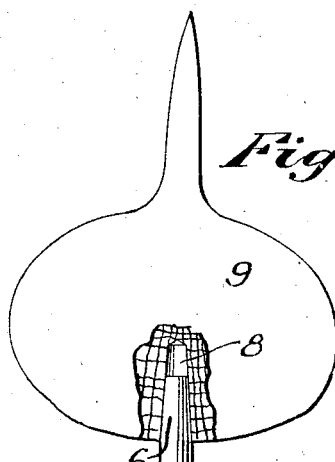
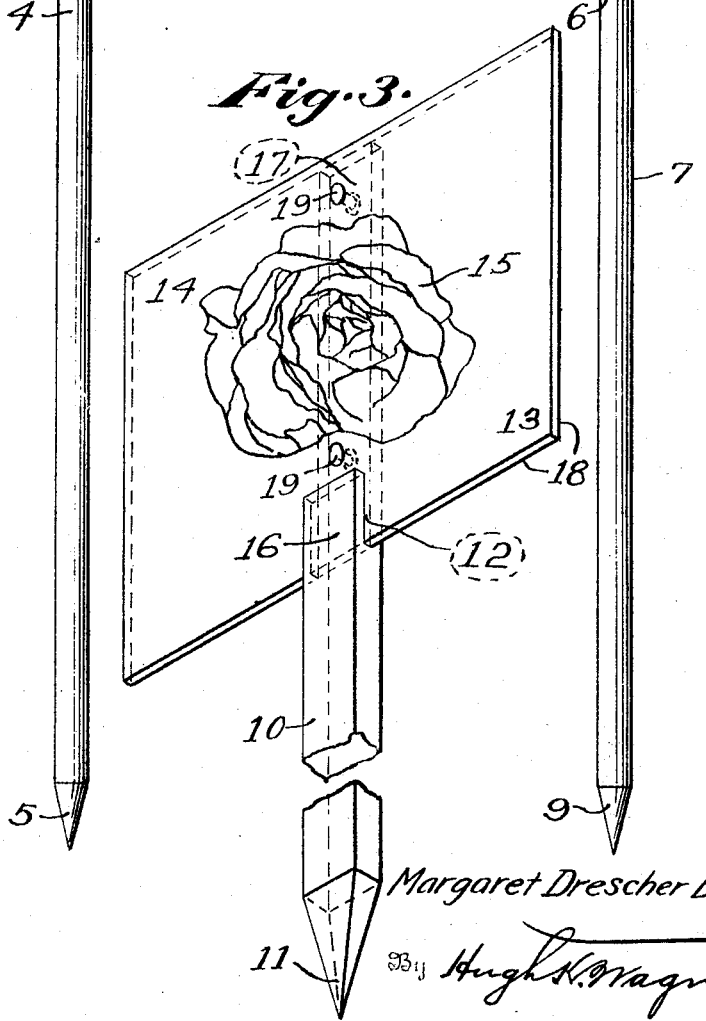
Inventor:
Margaret Drescher Boardman,
By Hugh K. Wagner
Attorney.

Patented July 7, 1925.

1,545,391

UNITED STATES PATENT OFFICE.

MARGARET DRESCHER BOARDMAN, OF CHICAGO, ILLINOIS.

INDICATOR.

Application filed October 12, 1923. Serial No. 668,064.

*To all whom it may concern:*

Be it known that I, MARGARET DRESCHER BOARDMAN, a citizen of the United States, residing at the city of Chicago, in the county of Cook and State of Illinois, have invented certain new and useful Improvements in Indicators, of which the following is a specification.

This invention relates to indicators, and pertains more particularly to an indicator for use in gardens, to identify the species of plant growing therein.

In gardens, as is well known, certain sections are allotted to certain plants, and it is desirable to have in each section some means of readily identifying the particular kind of plant growing therein, since it is impossible, prior to their appearance above the surface of the earth, to distinguish the different varieties without uncovering them, and moreover, often difficult to identify certain plants in the early stages of their growth. To provide such means of identification, which can be anchored in the earth and has an indicating character thereon visible above the surface of the earth, is the object of this invention.

Another object is to provide such a device which shall be durable and weatherproof.

A further object is to provide such a device which shall be simple in construction and which can be cheaply manufactured.

Other objects and advantages will be apparent as the description proceeds.

In the accompanying drawings forming part of this specification, in which like numbers of reference denote like parts wherever they occur, Figures 1 and 2 are respective side views of two distinct embodiments of this invention, parts being broken away in each to show the manner of attaching the stake to the head in each embodiment; and Figure 3 is a perspective view of another modification.

Referring to Figure 1, an artificial plant 1, preferably of wood, and in the present instance having the form of a potato and coated with a waterproof paint to resemble the same, has an interiorly screw-threaded socket 2, in which fits screw thread 3 of a stake 4, preferably of weatherproof wood, although other materials, as, for instance, a wire or iron rod, may be used. The stake 4 is preferably pointed at its lower end 5 to facilitate its insertion into the earth.

In the modification shown in Figure 2, the upper end 6 of the stake 7 is slightly tapered to fit a conical socket 8 in the head 9, which, for purposes of illustration, is here shown as a turnip. The tapered end 6 is securely held in the socket 8 by friction, and the lower end of the stake 7 has the usual point 9.

Still another modification is shown in Figure 3, in which the stake 10 is pointed at its lower end 11 and has a longitudinal slit 12 at its upper end, in which fits a plate or board 13, upon the front side 14 of which a designating character, such as a picture 15 of the plant indicated, may be painted in waterproof paint. The front tongue 16 of the slotted or bifurcated portion of the stake 10 preferably extends only a short way along the front 14 of the board 13, so as not to obscure the picture thereon. The rear tongue 17 preferably extends across the entire back 18 of the board 13 and is secured thereto in any suitable manner, preferably by rails or rivets 19.

It is not to be inferred, however, that the stake and head need necessarily be made separate as herein described, but they may be formed of a single piece. However, for economy and convenience in manufacture, and for various other apparent reasons, it is desirable that they be not integral with one another. Furthermore, this invention is not restricted in its scope to the precise manners of connecting the head and stake as shown herein.

The flat plate or board 13 shown in Figure 3 may be constructed of materials other than wood, such as strawboard, fiberboard or pasteboard, and the outline of the same need not necessarily be rectangular, as shown in Figure 3, but may be cut to follow intimately the outline or resemblance of the figure of the plant or vegetable to be indicated thereby. Such a flat imitation of a plant would be cheaper to construct than the solid forms shown in Figures 1 and 2.

Having thus described this invention, I hereby reserve the benefit of all changes in form, arrangement, order, or use of parts, as it is evident that many minor changes may be made therein without departing from the spirit of this invention or the scope of the following claim.

I claim:

In a garden plant indicator, a stake having its lower end pointed and its upper end screw threaded, and a model representation of a vegetable object in the round and provided at one end with a screw threaded socket for screwing on the stake, said model being painted in suitable colors with waterproof paint to resist atmospheric conditions.

In testimony whereof I hereunto affix my signature.

MARGARET DRESCHER BOARDMAN.